United States Patent
Li et al.

(10) Patent No.: US 12,172,613 B2
(45) Date of Patent: Dec. 24, 2024

(54) SYSTEM AND METHOD FOR IMPROVING RELEASE PERFORMANCE OF HEAVY-HAUL TRAIN

(71) Applicant: MEISHAN CRRC BRAKE SCIENCE & TECHNOLOGY CO., LTD., Sichuan (CN)

(72) Inventors: Qiaoyin Li, Sichuan (CN); Lei Xie, Sichuan (CN); Hong An, Sichuan (CN); Jie Zhang, Sichuan (CN); Yong Jiang, Sichuan (CN); Jiheng Wu, Sichuan (CN); Yu Zhu, Sichuan (CN); Yanfei Shen, Sichuan (CN); Jing Zhang, Sichuan (CN)

(73) Assignee: MEISHAN CRRC BRAKE SCIENCE & TECHNOLOGY CO., LTD., Sichuan (CN)

( * ) Notice: Subject to any disclaimer, the term of this patent is extended or adjusted under 35 U.S.C. 154(b) by 0 days.

(21) Appl. No.: 17/905,800

(22) PCT Filed: Mar. 9, 2022

(86) PCT No.: PCT/CN2022/079859
§ 371 (c)(1),
(2) Date: Sep. 7, 2022

(87) PCT Pub. No.: WO2023/273399
PCT Pub. Date: Jan. 5, 2023

(65) Prior Publication Data
US 2024/0017709 A1    Jan. 18, 2024

(30) Foreign Application Priority Data

Jun. 30, 2021   (CN) .......................... 202110739310.5

(51) Int. Cl.
*B60T 13/36* (2006.01)
*B61H 9/00* (2006.01)

(52) U.S. Cl.
CPC ............ *B60T 13/365* (2013.01); *B61H 9/006* (2013.01)

(58) Field of Classification Search
CPC .... B60T 17/228; B60T 13/683; B60T 13/365; B60T 13/665
(Continued)

(56) References Cited

U.S. PATENT DOCUMENTS 5,564,794 A * 10/1996 Hart .................. B60T 13/665
303/3
5,813,730 A    9/1998 Force
(Continued)

FOREIGN PATENT DOCUMENTS

CN    107161132 A    9/2017
CN    111873970 A    11/2020
(Continued)

*Primary Examiner* — Robert A. Siconolfi
*Assistant Examiner* — San M Aung
(74) *Attorney, Agent, or Firm* — NKL Law; Allen Xue

(57) ABSTRACT

A system for releasing the heavy-haul train has a control valve mounted in each of train cars. The control valve is connected to a train pipe, an auxiliary air reservoir and a brake cylinder are connected to the control valve, and an exhaust port is configured on the control valve. The exhaust port is connected to a solenoid valve. The method for improving the release performance of the heavy-haul train includes: S1: the solenoid valve in each of the train cars is powered on to close a passage between the exhaust port of the control valve and the atmosphere; S2: an automatic brake valve is regulated to inflate the train pipe; and S3: the solenoid valve in each of the train cars is powered off to open
(Continued)

the passage between the exhaust port of the control valve and the atmosphere, so that the train is released.

7 Claims, 2 Drawing Sheets

(58) Field of Classification Search
USPC .......................................................... 303/28
See application file for complete search history.

(56) References Cited

U.S. PATENT DOCUMENTS

| | | | |
|---|---|---|---|
| 6,213,565 B1 * | 4/2001 | Hart ...................... | B60T 13/665 |
| | | | 303/7 |
| 2018/0208220 A1 * | 7/2018 | Wright ................... | B61H 11/08 |
| 2019/0291705 A1 * | 9/2019 | Bailey ................... | B60T 13/683 |

FOREIGN PATENT DOCUMENTS

| | | |
|---|---|---|
| CN | 212243320 U | 12/2020 |
| CN | 112550253 A | 3/2021 |
| CN | 113428187 A | 9/2021 |

* cited by examiner

SYSTEM AND METHOD FOR IMPROVING RELEASE PERFORMANCE OF HEAVY-HAUL TRAIN

TECHNICAL FIELD

The present invention belongs to the technical field of train control systems, and particularly relates to a system and a method for improving the release performance of a heavy-haul train.

BACKGROUND

When a train needs to be released, the driver regulates an automatic brake valve to pressurize a train pipe, thus a control valve is switched to the release position to open a passage between a brake cylinder and the atmosphere, and the brake cylinder is depressurized to the atmospheric pressure to release a train car. Moreover, when the control valve is switched to the release position, the train pipe is connected to an auxiliary air reservoir. During the release process, the auxiliary air reservoir is inflated by means of the train pipe to prepare for the next brake.

The air travels at a certain speed, so the compressed air output by the locomotive air compressor arrives at the control valves of different train cars at different times through the train pipes, depending on the distance between the train cars and the locomotive, resulting in different release times for train cars at different positions. A heavy-haul train generally fills the compressed air to the train pipe in two-point air supply mode. For the train with long total length, it takes a long time for the compressed air to arrive at the rear train cars, the time interval between releasing front and rear train cars extends, thus increasing the longitudinal impulse force between the train cars.

When the train needs to be braked, the train pipe is depressurized, the control valve is switched to the braking position, and the passage between the auxiliary air reservoir and the brake cylinder is opened. The compressed air in the auxiliary air reservoir enters the brake cylinder to pressurize the brake cylinder and create a braking resistance. In order to ensure that the train car has a certain braking force, the pressure in the auxiliary air reservoir needs to reach or close to a set pressure. Therefore, a certain time interval between brake and release of the train is necessary. Particularly, when the heavy-haul train applies cycling braking on a long heavy down grade, the time for re-inflating the braking system after release and before the next brake of the train should be exactly matched with a natural acceleration on the down grade, so the operation is more difficult.

SUMMARY

In order to solve the above-mentioned defects of the prior art, the objective of the present invention is to provide a system and a method capable of reducing the longitudinal impulse force between train cars during release and simplifying the braking operation.

According to the technical solution:
a system for improving the release performance of a heavy-haul train, characterized by including a control valve mounted in each of train cars, the control valve is connected to a train pipe by means of a pipeline, an auxiliary air reservoir and a brake cylinder are respectively connected to the control valve by means of a pipeline, and an exhaust port is configured on the control valve; the exhaust port is connected to a solenoid valve by means of a pipeline, the solenoid valve is closed if powered on, and the solenoid valve is opened if powered off.

When the train pipe is inflated, the pressure in the train pipe rises, so that the control valve opens a passage between the brake cylinder and the exhaust port. Since the exhaust port of the control valve is connected to the solenoid valve, when the solenoid valve is powered on and closed, the brake cylinder may not discharge air to the atmosphere, and the train is kept in a braking state. When the train needs to be released, a driver controller sends a signal to the solenoid valve of each of the train cars to power off the solenoid valve, so that a passage between the exhaust port and the atmosphere is opened, the brake cylinder discharges air through the exhaust port of the control valve, and the train is released. Since the electrical signal travels faster than the air wave, the synchronization of release among the train cars is improved, so it is beneficial to reduce the longitudinal impulse force.

When the control valve is in the release position, the train pipe is connected to the auxiliary air reservoir to inflate the auxiliary air reservoir regardless of whether the solenoid valve is closed or open. Compared with the prior art, the present invention has the advantage of a release maintaining state, in which the solenoid valve is closed and the control valve is in the release position, so that the auxiliary air reservoir may be inflated in the release maintaining state and during the release process, thus avoiding the situation that the auxiliary air reservoir may only be inflated during the release process without the solenoid valve. When the heavy-haul train applies cycling braking on a long heavy down grade, the inflating time for the auxiliary air reservoir extends to ensure that the auxiliary air reservoir of each train car of the train is inflated and close to a set pressure; the time for re-inflating the braking system after release and before the next brake of the train is well matched with a natural acceleration on the down grade to reduce the operation difficulty; and the braking capacity and braking efficiency are consistent during each brake.

According to a preferred solution of the present invention, the solenoid valve is electrically connected to an electric control module; and a release control retainer is further included, and the release control retainer is communicated with the plurality of electric control modules through a wireless ad-hoc network. The release control retainer is mounted in a cab. The driver operates the release control retainer, and controls the electric control module in each of the train cars through the wireless ad-hoc network, and the electric control module controls the solenoid valve. In this way, the release control retainer may simultaneously cut off the release passages from the brake cylinders to the exhaust ports of the control valves in all of the train cars, or simultaneously open the release passages to relieve the pressure in the brake cylinders in all of the train cars at the same time, thereby greatly improving the release propagation rate and reducing the longitudinal impulse force in the speed regulation process. According to the preferred solution of the present invention, the electric control module is electrically connected to an accumulator. The electric control module is powered by the built-in accumulator, which may be charged on a locomotive, and may continuously work for 12 h after being fully charged. According to the preferred solution of the present invention, the control valve is also connected to an accelerated release reservoir by means of a pipeline.

According to the preferred solution of the present invention, the control valve is a 120 valve, a 120-1 valve or the like.

A method for improving the release performance of the heavy-haul train includes the following release processes:

S1: the solenoid valve in each of the train cars is powered on by means of wireless transmission to close the passage between the exhaust port of the control valve and the atmosphere;

S2: an automatic brake valve is regulated to inflate the train pipe and open the passage between the brake cylinder and the exhaust port in the passage of the control valve; and S3: the solenoid valve in each of the train cars is powered off by means of the wireless transmission to open the passage between the exhaust port of the control valve and the atmosphere, so that the train is released.

The driver sends a signal to a signal receiving apparatus mounted in each of the train cars of the train by means of a wireless transmission device to power on or power off the electric-controlled retaining solenoid valve of each of the train cars. After the train is braked, the passage between the exhaust port of the control valve and the atmosphere is closed when the electric-controlled retaining solenoid valve of each of the train cars is powered on. In this instance, the driver regulates the automatic brake valve to inflate the train pipe, and the pressure in the train pipe rises. Although the control valve opens the passage between the brake cylinder and the exhaust port, the brake cylinder may not discharge air to the atmosphere, thus the train is still in the braking state. When the train needs to be released, the driver controller sends a signal to the electric-controlled retaining solenoid valve of each of the train cars to power off the solenoid valve. Since all train pipes are fully pressurized, the passage between the brake cylinder and the exhaust port of each control valve is opened. When all of the solenoid valves are opened simultaneously, the passages between the exhaust ports of the control valves and the atmosphere are opened at the same time, and the pressure in the brake cylinders is reduced, thus the train is released. Since the electrical signal travels faster than the air wave, the synchronization of release among the train cars is improved, so it is beneficial to reduce the longitudinal impulse force.

According to the preferred solution of the present invention, a braking process is included:

S4: the automatic brake valve is regulated to depressurize the train pipe and switch the control valve to the braking position, so that the passage between the auxiliary air reservoir and the brake cylinder is opened, and the compressed air enters the brake cylinder from the auxiliary air reservoir and pressurizes the brake cylinder to create a braking resistance.

When the train pipe is inflated, the pressure in the train pipe rises, so that the control valve opens the passage between the brake cylinder and the exhaust port. In addition, the passage between the train pipe and the auxiliary air reservoir is opened, thus the auxiliary air reservoir is inflated by means of the train pipe. In the release maintaining state, the solenoid valve is closed, the passage between the exhaust port of the control valve and the atmosphere is closed, the control valve is in the release position, and the train pipe is connected to the auxiliary air reservoir. Therefore, the auxiliary air reservoir is connected to the train pipe and may be inflated thereby in the release maintaining state and during the release process, thus avoiding the situation that the auxiliary air reservoir may only be inflated during the release process without the solenoid valve. When the heavy-haul train applies cycling braking on the long heavy down grade, the inflating time for the auxiliary air reservoir extends to ensure that the auxiliary air reservoir of each train car of the train is inflated and close to a set pressure; and the time for re-inflating the braking system after release and before the next brake of the train is well matched with the natural acceleration on the down grade to reduce the operation difficulty. According to the preferred solution of the present invention, in step S1, the release control retainer sends a release retaining signal to the electric control module through the wireless ad-hoc network, so that the solenoid valve is powered on; and in step S3, the release control retainer sends an electric-controlled release signal to the electric control module through the wireless ad-hoc network, so that the solenoid valve is powered off. The release control retainer of the present invention may control the electric control module through the wireless ad-hoc network, and the electric control module controls the solenoid valve, thereby conveniently realizing synchronous and remote control of the plurality of solenoid valves, and ensuring that all of the control valves are released synchronously.

According to the preferred solution of the present invention, following steps are further included:

The present invention has the following beneficial effects:

1. since the exhaust port of the control valve of the present invention is connected to the solenoid valve, when the solenoid valve is powered on and closed, the brake cylinder may not discharge air to the atmosphere, and the train is kept in a braking state; and When the train needs to be released, the driver controller sends a signal to the electric-controlled retaining solenoid valve of each of the train cars to power off the solenoid valve. Since all train pipes are fully pressurized, the passage between the brake cylinder and the exhaust port of each control valve is opened. When all of the solenoid valves are opened simultaneously, the passages between the exhaust ports of the control valves and the atmosphere are opened at the same time, and the pressure in the brake cylinders is reduced, thus the train is released. Since the electrical signal travels faster than the air wave, the synchronization of release among the train cars is improved, so it is beneficial to reduce the longitudinal impulse force.

2. the auxiliary air reservoir is connected to the train pipe and may be inflated thereby in the release maintaining state and during the release process, thus avoiding the situation that the auxiliary air reservoir may only be inflated during the release process without the solenoid valve. When the heavy-haul train applies cycling braking on the long heavy down grade, the inflating time for the auxiliary air reservoir extends to ensure that the auxiliary air reservoir of each train car of the train is inflated and close to a set pressure; and the time for re-inflating the braking system after release and before the next brake of the train is well matched with the natural acceleration on the down grade to reduce the operation difficulty.

Figure 1:
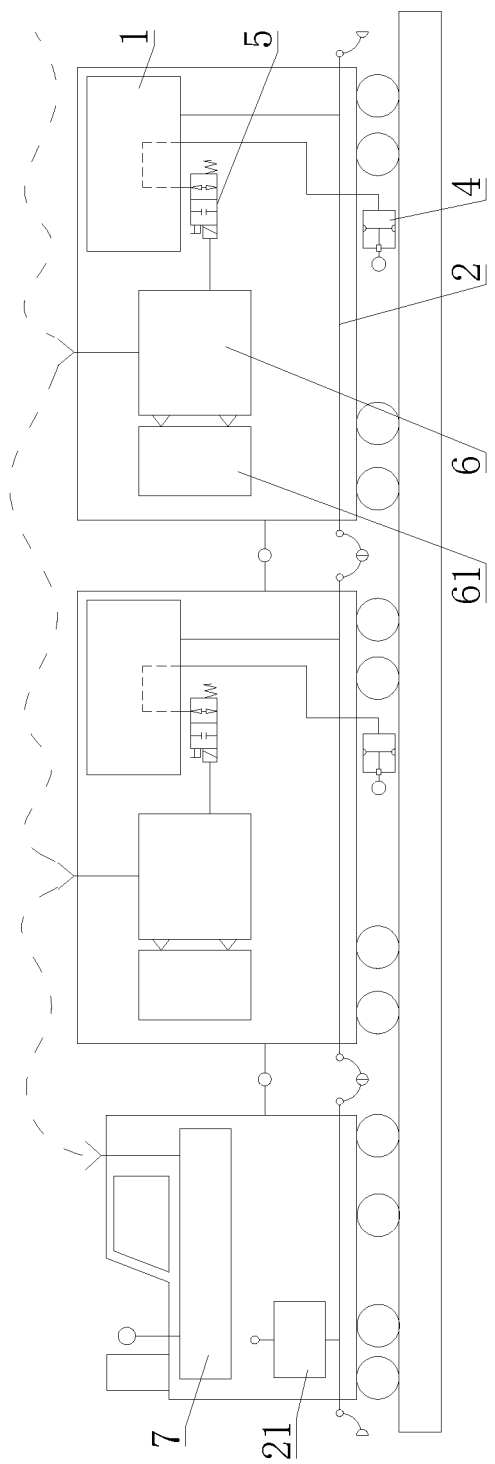
FIG. 1 is a structural diagram of installation relation of the present invention.

In the figures, 1—control valve; 2—train pipe; 3—auxiliary air reservoir; 4—brake cylinder; 5—solenoid valve;

6—electric control module; 7—release control retainer; 11—exhaust port; 12—accelerated release reservoir; 21—automatic brake valve; 61—accumulator.

DESCRIPTION OF THE PREFERRED EMBODIMENTS

The embodiments of the present invention are described below and examples of the embodiments are shown in the drawings, in which the same or similar reference symbols always indicate the same or similar elements or elements with the same or similar functions. The embodiments described below with reference to the drawings are exemplary only for explaining the present invention, and should not be construed as limiting the present invention.

Figure 2:
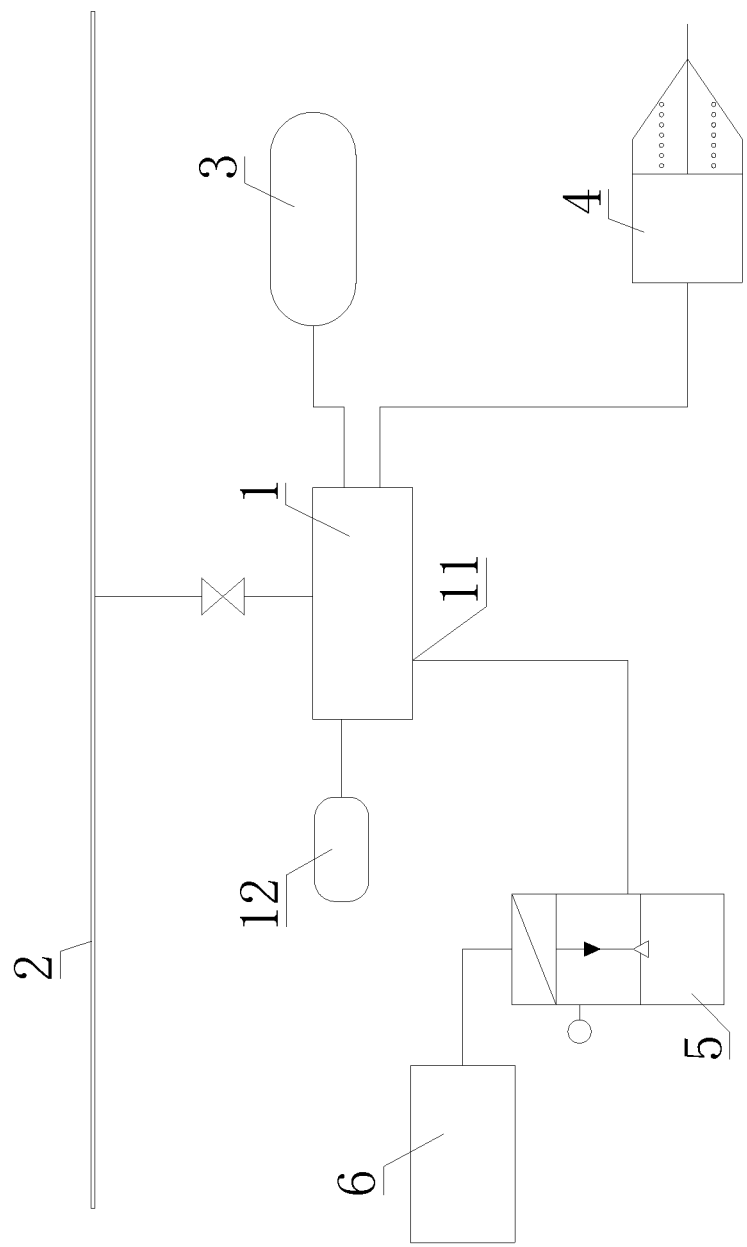
FIG. 2 is a partial structural diagram of the present invention.

As shown in FIGS. 1 and 2, the embodiment provides a system for improving the release performance of a heavy-haul train, including a control valve 1 mounted in each of train cars, the control valve 1 is connected to a train pipe 2 by means of a pipeline, an auxiliary air reservoir 3 and a brake cylinder 4 are respectively connected to the control valve 1 by means of a pipeline, and an exhaust port 11 is configured on the control valve 1; the exhaust port 11 is connected to a solenoid valve 5 by means of a pipeline, the solenoid valve 5 is closed if powered on, and the solenoid valve 5 is opened if powered off. The control valve 1 is also connected to an accelerated release reservoir 12 by means of a pipeline. The control valve 1 is a 120 valve, a 120-1 valve or the like.

When the train pipe 2 is inflated, the pressure in the train pipe 2 rises, so that the control valve 1 opens a passage between the brake cylinder 4 and the exhaust port 11. Since the exhaust port 11 of the control valve 1 is connected to the solenoid valve 5, when the solenoid valve 5 is powered on and closed, the brake cylinder 4 may not discharge air to the atmosphere, and the train is kept in a braking state. When the train needs to be released, a driver controller sends a signal to the solenoid valve 5 of each of the train cars to power off the solenoid valve 5, so that a passage between the exhaust port 11 and the atmosphere is opened, the brake cylinder 4 discharges air through the exhaust port 11 of the control valve 1, and the train is released. Since the electrical signal travels faster than the air wave, the synchronization of release among the train cars is improved, so it is beneficial to reduce the longitudinal impulse force.

Since the driver controls the pressure release from the brake cylinder 4 of each of the train cars by means of an electronic-controlled release retaining device, the brake cylinder 4 does not release even when the control valve 1 releases, thereby effectively avoiding the out-of-control problem caused by some self-released train cars due to the pressure surge in the train pipe 2, and greatly improving the safety on the long heavy down grade.

When the control valve 1 is in the release position, the train pipe 2 is connected to the auxiliary air reservoir 3 to inflate the auxiliary air reservoir 3 regardless of whether the solenoid valve 5 is closed or open. Compared with the prior art, the present invention has the advantage of a release maintaining state, in which the solenoid valve 5 is closed and the control valve 1 is in the release position, so that the auxiliary air reservoir 3 may be inflated in the release maintaining state and during the release process, thus avoiding the situation that the auxiliary air reservoir 3 may only be inflated during the release process without the solenoid valve 5. When the heavy-haul train applies cycling braking on a long heavy down grade, the inflating time for the auxiliary air reservoir 3 extends to ensure that the auxiliary air reservoir 3 of each train car of the train is inflated and close to a set pressure; the time for re-inflating the braking system after release and before the next brake of the train is well matched with a natural acceleration on the down grade to reduce the operation difficulty; and the braking capacity and braking efficiency are consistent during each brake.

Further, the solenoid valve 5 is electrically connected to an electric control module 6; and a release control retainer 7 is further included, and the release control retainer 7 is communicated with the plurality of electric control modules 6 through a wireless ad-hoc network. The release control retainer 7 is mounted in a cab. The driver operates the release control retainer 7, and controls the electric control module 6 in each of the train cars through the wireless ad-hoc network, and the electric control module 6 controls the solenoid valve 5. In this way, the release control retainer 7 may simultaneously cut off the release passages from the brake cylinders 4 to the exhaust ports 11 of the control valves 1 in all of the train cars, or simultaneously open the release passages to relieve the pressure in the brake cylinders 4 in all of the train cars at the same time, thereby greatly improving the release propagation rate and reducing the longitudinal impulse force in the speed regulation process. Where, the electric control module 6 is electrically connected to an accumulator 61. The electric control module 6 is powered by the built-in accumulator 61, which may be charged on a locomotive, and may continuously work for 12 h after being fully charged.

The release control retainer 7:

The release control retainer 7 is disposed in the cab and operated by the driver, and an antenna is disposed outside the locomotive. Its main functions and parameters are shown below:

① power supply by the built-in accumulator 61, which may be charged on the locomotive, and may continuously work for 12 h after being fully charged;

② sending the electric-controlled release signal and the release retaining signal through the wireless ad-hoc network; and ③ detecting the network signal of all of the train cars and display the network disconnection.

An on-board release retaining device:

The on-board release retaining device is mounted on a chassis of each of the train cars and includes the accumulator 61, the electric control module 6 and the solenoid valve 5 module.

Where, the accumulator 61 is mounted on the bottom of the train car and easily to be dismounted and mounted. Its main functions and parameters are shown below:

① supplying power to the electric control module 6;

② capacity: 250 Ah;

③ temperature of working environment: −20° C.-50° C., temperature of charging environment: 0° C.-40° C.; and ④ protection level: IP65.

Where, the electric control module 6 is mounted on the chassis of each of the train cars in such a way that it may be integrated with the accumulator 61. Its main functions and parameters are shown below:

① an electric-controlled release function: powering off the solenoid valve 5 module upon receiving the electric-controlled release signal through the wireless ad-hoc network;

② a release retaining function: powering on the solenoid valve 5 module upon receiving the release retaining signal through the wireless ad-hoc network;

③ power consumption: 5 W max.;

④ temperature of working environment: −20° C.-50° C.; and
⑤ protection level: IP65.

Where, the solenoid valve 5 module is formed by mounting the solenoid valve 5 on a lower bonnet of a main valve of the 120 distribution valve or the 120-1 distribution valve to replace the lower bonnet of the main valve. The solenoid valve 5 is connected to the electric control module 6 through a power line to control the opening and closing of the exhaust port 11 of the brake cylinder 4. Its main functions and parameters are shown below:
① the electric-controlled release function: powering off the solenoid valve 5 to open the exhaust port 11 of the brake cylinder 4;
② the release retaining function: powering on the solenoid valve 5 to close the exhaust port 11 of the brake cylinder 4;
③ exhaust aperture: 2.9 mm;
③ power consumption: 10 W max.;
⑤ temperature of working environment: −20° C.-50° C.;
⑥ protection level: IP55.

A method for improving the release performance of the heavy-haul train includes the following release processes:
S1: powering on the solenoid valve 5 in each of the train cars by means of wireless transmission to close the passage between the exhaust port 11 of the control valve 1 and the atmosphere;
S2: regulating an automatic brake valve 21 to inflate the train pipe 2 and open a passage between the brake cylinder 4 and the exhaust port 11 in the passage of the control valve 1; and
S3: powering off the solenoid valve 5 in each of the train cars by means of the wireless transmission to open the passage between the exhaust port 11 of the control valve 1 and the atmosphere, so that the train is released.

The driver sends a signal to a signal receiving apparatus mounted in each of the train cars of the train by means of a wireless transmission device to power on or power off the electric-controlled retaining solenoid valve 5 of each of the train cars. After the train is braked, the passage between the exhaust port 11 of the control valve 1 and the atmosphere is closed when the electric-controlled retaining solenoid valve 5 of each of the train cars is powered on. In this instance, the driver regulates the automatic brake valve 21 to inflate the train pipe 2, and the pressure in the train pipe 2 rises. Although the control valve 1 opens the passage between the brake cylinder 4 and the exhaust port 11, the brake cylinder 4 may not discharge air to the atmosphere, thus the train is still in the braking state. When the train needs to be released, the driver controller sends a signal to the electric-controlled retaining solenoid valve 5 of each of the train cars to power off the solenoid valve 5. Since all train pipes 2 are fully pressurized, the passage between the brake cylinder 4 and the exhaust port 11 of each control valve 1 is opened. When all of the solenoid valves 5 are opened simultaneously, the passages between the exhaust ports 11 of the control valves 1 and the atmosphere are opened at the same time, and the pressure in the brake cylinders 4 is reduced, thus the train is released. Since the electrical signal travels faster than the air wave, the synchronization of release among the train cars is improved, so it is beneficial to reduce the longitudinal impulse force.

The method of the present invention further includes a braking process:
S4: regulating the automatic brake valve 21 to depressurize the train pipe 2 and switch the control valve 1 to the braking position, so that the passage between the auxiliary air reservoir 3 and the brake cylinder 4 is opened, and compressed air in the auxiliary air reservoir 3 enters the brake cylinder 4 and pressurizes the brake cylinder 4 to create a braking resistance.

When the train pipe 2 is inflated, the pressure in the train pipe 2 rises, so that the control valve 1 opens the passage between the brake cylinder 4 and the exhaust port 11. In addition, the passage between the train pipe 2 and the auxiliary air reservoir 3 is opened, thus the auxiliary air reservoir 3 is inflated by means of the train pipe 2. In the release maintaining state, the solenoid valve 5 is closed, the passage between the exhaust port 11 of the control valve 1 and the atmosphere is closed, the control valve 1 is in the release position, and the train pipe 2 is connected to the auxiliary air reservoir 3. Therefore, the auxiliary air reservoir 3 is connected to the train pipe 2 and may be inflated thereby in the release maintaining state and during the release process, thus avoiding the situation that the auxiliary air reservoir 3 may only be inflated during the release process without the solenoid valve 5. When the heavy-haul train applies cycling braking on a long heavy down grade, the inflating time for the auxiliary air reservoir 3 extends to ensure that the auxiliary air reservoir 3 of each train car of the train is inflated and close to a set pressure; the time for re-inflating the braking system after release and before the next brake of the train is well matched with a natural acceleration on the down grade to reduce the operation difficulty; and the braking capacity and braking efficiency are consistent during each brake.

When the train pipe 2 is depressurized, the pressure reduction by speed regulating braking is very small, so the depressurization process takes a short time.

In step S1, the release control retainer 7 sends an release retaining signal to the electric control module 6 through the wireless ad-hoc network, then the solenoid valve 5 is powered on; and in step S3, the release control retainer 7 sends an electric-controlled release signal to the electric control module 6 through the wireless ad-hoc network, then the solenoid valve 5 is powered off. The release control retainer 7 of the present invention may control the electric control module 6 through the wireless ad-hoc network, and the electric control module 6 controls the solenoid valve 5, thereby conveniently realizing synchronous and remote control of the plurality of solenoid valves 5, and ensuring that all of the control valves 1 are released synchronously.

It should be understood that the present invention is not limited to the above-mentioned optional embodiments, and anyone can realize products in other forms under the inspiration of the present invention. However, all the technical solutions falling into the scope as defined by the claims of the present invention, regardless of any changes in shapes or structures, will fall within the protection scope of the present invention.

The invention claimed is:

1. A system for improving the release performance of a heavy-haul train, comprising: a control valve (1) mounted in each of train cars in the heavy-haul train, the control valve (1) being connected to a train pipe (2);
an auxiliary air reservoir (3) and a brake cylinder (4) respectively connected to the control valve (1); and
an exhaust port (11) configured on the control valve (1) connected to a solenoid valve (5),
wherein the solenoid valve (5) is closed when powered on, and the solenoid valve (5) is when powered off, wherein the solenoid valve (5) is electrically connected to an electric control module (6); and further comprises a release control retainer (7), and the release control retainer (7) is communicated with the plurality of electric control modules (6) through a wireless ad-hoc network.

2. The system for improving the release performance of the heavy-haul train according to claim 1, wherein the electric control module (6) is electrically connected to an accumulator (61).

3. The system for improving the release performance of the heavy-haul train according to claim 1, wherein the control valve (1) is also connected to an accelerated release reservoir (12) by means of a pipeline.

4. A system for improving the release performance of a heavy-haul train, comprising:
- a control valve (1) mounted in each of train cars in the heavy-haul train, the control valve (1) being connected to a train pipe (2);
- an auxiliary air reservoir (3) and a brake cylinder (4) respectively connected to the control valve (1); and
- an exhaust port (11) configured on the control valve (1) connected to a solenoid valve (5), wherein the solenoid valve (5) is closed when powered on, and the solenoid valve (5) is opened when powered off, and
- wherein the control valve (1) is a 120 valve or a 120-1 valve.

5. A method for improving the release performance of the heavy-haul train using the system of claim 1, comprising:
- S1: powering on the solenoid valve (5) in each of the train cars by means of wireless transmission to close a passage between the exhaust port (11) of the control valve (1) and the atmosphere;
- S2: regulating an automatic brake valve (21) to inflate the train pipe (2) and open a passage between the brake cylinder (4) and the exhaust port (11) in the passage of the control valve (1); and
- S3: powering off the solenoid valve (5) in each of the train cars by means of the wireless transmission to open the passage between the exhaust port (11) of the control valve (1) and the atmosphere to release the train.

6. The method for improving the release performance of the heavy-haul train according to claim 5, further comprising:
- S4: regulating the automatic brake valve (21) to depressurize the train pipe (2) and switch the control valve (1) to the braking position to open the passage between the auxiliary air reservoir (3) and the brake cylinder (4), and compressed air in the auxiliary air reservoir (3) enters the brake cylinder (4) and pressurizes the brake cylinder (4) to create a braking resistance.

7. The method for improving the release performance of the heavy-haul train according to claim 5, wherein in step S1, the release control retainer (7) sends a release retaining signal to the electric control module (6) through the wireless ad-hoc network, to power on the solenoid valve (5); and in step S3, the release control retainer (7) sends an electric-controlled release signal to the electric control module (6) through the wireless ad-hoc network, to power off the solenoid valve (5).

\* \* \* \* \*